(12) United States Patent
Trinschek et al.

(10) Patent No.: US 9,295,114 B2
(45) Date of Patent: Mar. 22, 2016

(54) LED LIGHT UNIT AND METHOD OF OPERATING AN LED LIGHT

(71) Applicant: Goodrich Lighting Systems GmbH, Lippstadt (DE)

(72) Inventors: Robert Trinschek, Hamm (DE); Andre Hessling von Heimendahl, Koblenz (DE); Steffen Roebke, Paderborn (DE)

(73) Assignee: GOODRICH LIGHTING SYSTEMS GMBH (DE)

( * ) Notice: Subject to any disclaimer, the term of this patent is extended or adjusted under 35 U.S.C. 154(b) by 0 days.

(21) Appl. No.: 14/262,226

(22) Filed: Apr. 25, 2014

(65) Prior Publication Data

US 2014/0333221 A1    Nov. 13, 2014

(30) Foreign Application Priority Data

May 10, 2013    (EP) ...................................... 13167275

(51) Int. Cl.
*H05B 37/00* (2006.01)
*H05B 33/08* (2006.01)
*H05B 41/00* (2006.01)

(52) U.S. Cl.
CPC ............ *H05B 33/0809* (2013.01); *H05B 33/08* (2013.01); *H05B 33/0842* (2013.01); *H05B 41/00* (2013.01); *Y02B 20/346* (2013.01); *Y10T 29/49817* (2015.01)

(58) Field of Classification Search
CPC ...................................................... H05B 33/08
USPC ............. 315/185 R, 186, 187, 188, 192, 193, 315/209 R, 246, 247
See application file for complete search history.

(56) References Cited

U.S. PATENT DOCUMENTS

| | | | |
|---|---|---|---|
| 2006/0083507 A1 | 4/2006 | Endo | |
| 2006/0087253 A1 | 4/2006 | Chen | |
| 2011/0273102 A1* | 11/2011 | van De Ven et al. | 315/193 |
| 2012/0187762 A1* | 7/2012 | Kim | 307/32 |
| 2013/0057165 A1* | 3/2013 | Ide et al. | 315/186 |
| 2013/0069547 A1* | 3/2013 | van De Ven et al. | 315/188 |
| 2015/0002040 A1* | 1/2015 | Malyna et al. | 315/201 |

FOREIGN PATENT DOCUMENTS

JP    2008089950 A    4/2008

OTHER PUBLICATIONS

European Search Report for application 13167275.0-1802 mailed Oct. 14, 2013.

* cited by examiner

*Primary Examiner* — Minh D A
(74) *Attorney, Agent, or Firm* — Cantor Colburn LLP (57) ABSTRACT

An LED light unit, in particular for a passenger transport vehicle, such as an aircraft, a road vehicle, a ship or a rail car, is disclosed that has at least one LED and is configured to be used with a high intensity discharge lamp power supply that is adapted to monitor its output behavior. The LED light unit comprises a power input coupleable to the high intensity discharge lamp power supply, a capacitor switchably coupled to the power input for absorbing electrical energy from the high intensity discharge lamp power supply, and a power dissipating element switchably coupled to the power input for dissipating electrical energy from the high intensity discharge lamp power supply.

14 Claims, 5 Drawing Sheets

LED LIGHT UNIT AND METHOD OF OPERATING AN LED LIGHT

CROSS REFERENCE TO RELATED APPLICATIONS

This application claims priority to European Patent Application No. 13 167 275.0 filed May 10, 2013, the entire contents of which is incorporated herein by reference.

FIELD OF THE INVENTION

The invention relates to exterior lighting systems for passenger transport vehicles, such as aircraft, ships, road vehicles or rail cars. In particular, it relates to an LED light unit for such passenger transportation vehicles, such as an LED headlamp.

BACKGROUND

In many passenger transport vehicles, such as air planes or cars, high intensity discharge lamps (HID lamps) are commonly in use for exterior lighting purposes. Exemplary high intensity discharge lamps are xenon lamps. While high intensity discharge lamps have high illumination capacities, they are not very energy efficient.

Many passenger transport vehicles have very long life cycles, at least when compared to the life cycles of existing high intensity discharge lamps. Also, changes to the standardization of components for such passenger transport vehicles, such as changes to the standardized power supply system for the exterior lighting of an air plane, tend to be lengthy and cumbersome. As a consequence, much of the technology used in passenger transport vehicles is frozen for long periods of time, either due to the presence of the remaining components in a passenger transport vehicle when replacing certain components or due to industry standards that are constant for long times.

Accordingly, it would be beneficial to provide a light unit that is more energy efficient and that can be used in passenger transport vehicles without changing their power supply systems. Further, it would be beneficial to provide a method of operating such light units. Additionally, it would be beneficial to provide a method of replacing existing high intensity discharge lamps with such light units while keeping the wiring of the power supply systems.

SUMMARY

Exemplary embodiments of the invention include an LED light unit, in particular for a passenger transport vehicle, such as an aircraft, a road vehicle, a ship or a rail car, the LED light unit having at least one LED and being configured to be used with a high intensity discharge lamp power supply that is adapted to monitor its output behavior, wherein the LED light unit comprises a power input coupleable to the high intensity discharge lamp power supply, a capacitor switchably coupled to the power input for absorbing electrical energy from the high intensity discharge lamp power supply, and a power dissipating element switchably coupled to the power input for dissipating electrical energy from the high intensity discharge lamp power supply.

The present invention uses one or more LED's as light sources for the light unit. Modern LED's are more energy efficient than high intensity discharge lamps (HID lamps). Higher energy efficiency means that the one or more LED's require less power than an HID lamp for a given light intensity. In the alternative, the one or more LED's have a higher light intensity than an HID lamp for a given power supplied to the light source. Consequently, the inventive LED light unit has higher energy efficiency than existing HID lamps.

While having higher energy efficiency, the LED light unit in accordance with the invention has a circuit structure that facilitates the using of the LED light unit with conventional high intensity discharge lamp power supplies (HID power supplies), i.e., with conventional power supplies that are used for driving high intensity discharge lamps. Some kinds of such conventional power supplies monitor their electric output behavior, i.e., the electric behavior at their output, in order to determine if the driven high intensity discharge lamp is working properly. The circuit structure of the inventive LED light unit allows the LED light unit to be operated in such a way that such conventional power supplies think a properly working HID lamp is connected. Therefore, the conventional power supplies in operation keep providing power, such that an operation of the inventive LED light unit with conventional power supplies for HID lamps is achieved.

In particular, the LED light unit has a capacitor switchably coupled to the power input and a power dissipating element switchably coupled to the power input. In this way, a capacitor and a power dissipating element can be selectively connected to the power input. These circuit elements provide capacitive and resistive loads that can be switched on and off. In this way, the electric behavior of the LED light unit can be adjusted in such a way that it complies with an electric behavior expected by the conventional power supply. This compliance ensures, in operation, a continued provision of electrical power from the conventional power supply to the LED light unit and a continued operation of the LED light unit.

The term "switchably coupled" means that the element in question can be selectively coupled to the power input, i.e. that it is selectively coupleable to the power input. A selective coupling refers to time-selective coupling. This may be achieved via according switches. The term coupled does not require an immediate connection, while an immediate electrical connection is a form of coupling. Further circuit elements may be interposed between two coupled circuit elements.

In a particular embodiment, the capacitor may be switchably coupled to the power input by a first switch. The capacitor and the first switch may be connected in series.

In a further particular embodiment, the power dissipating element may be switchably coupled to the power input by a second switch. The power dissipating element and the second switch may be connected in series.

The capacitor is provided for absorbing electrical energy from the high intensity discharge lamp power supply. It may also be provided for building up a voltage drop across the capacitor. The term capacitor may refer to any kind of capacitive element, such as a discrete circuit element or a parasitic capacitance.

The power dissipating element is provided for dissipating electrical energy from the high intensity discharge lamp power supply. It may also be provided for affecting a voltage drop across the power dissipating element, when electrical current is run therethrough.

The term "monitor its output behavior" means that the high intensity discharge power supply checks if the electric behavior at its power output terminal is within a pre-determined acceptable range. The monitored electric output behavior may refer to one or any subset of the output current behavior, the output voltage behavior and the output power behavior. It may refer to momentary values and/or to developments over time. For example, the integration of the output power over time may yield the energy output in a particular time frame.

According to a further embodiment, the power dissipating element is a resistor. A resistor is a low cost power dissipating element. It serves both the purposes of dissipating electrical energy and affecting a voltage drop, when current flows through the resistor.

According to a further embodiment, the capacitor is connected in series with a first switch and the power dissipating element is connected in series with a second switch, wherein the series connection of the capacitor and the first switch is connected in parallel with the series connection of the power dissipating element and the second switch. The series connection of the respective switch and the capacitor/power dissipating element provides for the option of entirely disconnecting the capacitor/power dissipating element from the power input. With the respective switch being open, the capacitor/power dissipating element has no effect on the overall electric behavior of the LED light unit (with the exception of some potential parasitic effects).

Connecting the series connection of the capacitor and the first switch in parallel with the series connection of the power dissipating element and the second switch allows for the capacitive influence of the capacitor and the resistive influence of the power dissipating element to be switched on/off independent from each other. In other words, the available capacitance and resistance can be combined freely at any point in time. In this way, a large degree of freedom for adjusting the behavior of the LED light unit is achieved.

According to a further embodiment, the LED light unit further comprises a control circuit coupled to the power input, wherein the control circuit is configured to sense an electric behavior at the power input and is further configured to selectively couple the capacitor to the power input and to selectively couple the power dissipating element to the power input as a response to the electric behavior at the power input. In this way, the control circuit is able to deduce from the electric behavior at the power input which kind of driving power the high intensity discharge power supply provides at a given point in time. The control circuit is further able to deduce from the kind of driving power which behavior the high intensity discharge power supply would expect at that point in time from an HID lamp. Accordingly, the control circuit is able to condition the behavior of the LED light unit by coupling the capacitor and/or the power dissipating element to the power input, if applicable.

Sensing the electric behavior at the power input may refer to the connection point where the LED light unit is coupled to the power supply in operation. Additionally, it may also refer to the electric behavior at a power distribution point, to which the capacitor, the power dissipating element and the at least one LED is coupled. This power distribution point may be different from above mentioned connection point to the power supply. For example, a current and/or voltage conditioning circuit or any other input circuitry may be coupled between the connection point to the power supply and the power distribution point, as will be discussed in greater detail below.

Again, the electric behavior at the power input may refer to one or any subset of the input current behavior, the input voltage behavior and the input power behavior, both as momentary values and/or developments over time.

The control circuit may comprise control logic. It is also possible that the control circuit comprises a micro controller, which carries out a program for affecting the control.

According to a further embodiment, the control circuit is configured to selectively couple the capacitor to the power input and to selectively couple the power dissipating element to the power input in such a way that the LED light unit emulates an electric behavior of a high intensity discharge lamp. By emulating the electric behavior of the high intensity discharge lamp, it is ensured that the high intensity behavior of an HID lamp. It may also be sufficient to generate an electric behavior that is within the tolerances of what is acceptable to the high intensity discharge lamp power supply. By making use of these tolerances, the capacitor and/or the power dissipating element may have lower values and therefore may be less costly and/or less bulky. Also, the LED light unit may be configured to have even lower power requirements and/or have other advantages in addition to satisfying the expectations of the power supply.

In more general terms, the control circuit may be configured to selectively couple the capacitor to the power input and to selectively couple the power dissipating element to the power input in such a way that the LED light unit exhibits a predetermined behavior. This predetermined behavior satisfies the expectations by the power supply.

According to a further embodiment, the control circuit is configured to couple the capacitor to the power input in a charging phase. In particular, the control circuit may be configured to couple the capacitor to the power input by closing the first switch. Coupling the capacitor to the power input results in a charge built up on the capacitor, which results in a voltage across the capacitor. This voltage may be noticed by the power supply. As a conventional HID lamp builds up a voltage in a start phase, i.e. in a charging phase, the building-up of the charge at the capacitor emulates the behavior of a conventional HID lamp in a start phase.

In the charging phase, the power dissipating element may be de-coupled from the power input, in particular by controlling the second switch to be in an open state.

The control circuit may be configured to couple the capacitor to the power input in the charging phase as a response to the detection of an AC power at the power input. In particular, the coupling of the capacitor to the power input may be triggered by a switch from a zero power state to the provision of AC power by the power supply to the power input.

According to a further embodiment, the control circuit is configured to couple the power dissipating element to the power input in a voltage conditioning phase. In particular, the control circuit may also be configured to de-couple the capacitor from the power input in the voltage conditioning phase. In particular, the control circuit may be configured to couple the power dissipating element to the power input by closing the second switch and, if applicable, to de-couple the capacitor from the power input by opening the first switch.

De-coupling the capacitor from the power input results in that the voltage across the capacitor is no longer provided to the power input from the capacitor side, at least after some transitioning period. Coupling the power dissipating element to the power input may result in a current flow through the power dissipating element, which in turn gives rise to a voltage across the power dissipating element. This voltage across the power dissipating element may be noticed by the power supply. As a conventional HID lamp enters a phase of a decreasing voltage after illumination of the lamp and enters into a state of moderate power reception, the voltage drop across the power dissipating element emulates the behavior of the conventional HID lamp in a transitional phase between the starting and the nominal operation. This phase is referred to as the voltage conditioning phase in the present application.

The control circuit may be configured to couple the power dissipating element to the power input and, if applicable, to de-couple the capacitor from the power input in the voltage conditioning phase as a response to the detection of a switch from AC power to DC power at the power input.

According to a further embodiment, the control circuit is configured to de-couple the power dissipating element from the power input in a nominal operation mode. In particular, the control circuit may also be configured to de-couple the capacitor from the power input in the nominal operation mode. In particular, the control circuit may be configured to de-couple the power dissipating element from the power input by opening the second switch and, if applicable, to de-couple the capacitor from the power input by opening the first switch. In this way, substantially the entire power supplied by the power supply to the LED light unit is provided to the at least one LED and no power is supplied to the capacitor and the power dissipating element. Accordingly, the LED light unit can be operated in a favorable, energy-efficient manner. In this context, the term nominal operation mode refers to the mode of operation where the at least one LED is illuminating light in a steady state.

The control circuit may be configured to de-couple the power dissipating element and, if applicable, the capacitor from the power input as a response to the detection of a DC power at the power input falling below a preset threshold value.

According to a further embodiment, the number and connection of the LED(s) is such that the LED light unit emulates the electric behavior of an HID lamp and/or that the behavior of the LED light unit in the nominal operation mode is in an expected behavior range of the high intensity discharge power supply.

According to a further embodiment, the number and connection of the LED(s) is such that the LED light unit maximizes the illumination output for a given power supplied in the nominal operation mode. In particular, the at least one LED may be a series connection of a plurality of LED's for this purpose.

According to a further embodiment, the at least one LED is switchably coupled to the power input. In particular, the at least one LED may be switchably coupled to the power input via a third switch. Further in particular, the control circuit may be configured to couple the at least one LED to the power input by closing the third switch. In this way, the LED's can be switched on by the defined action of closing the third switch. The at least one LED is therefore coupleable to the power input independent from the capacitor and the power dissipating element. In this way, the LED light unit can be controlled to exhibit a desired behavior via the capacitor and the power dissipating element without any influence by the LEDs.

It is pointed out, however, that the at least one LED may also be fixedly coupled to the power input. This may lead to the LED's lighting up earlier and/or influencing the current flow to/through the capacitor and/or the power dissipating element. These effects can also be handled by controlling the first and second switches in a suitable manner.

According to a further embodiment, the at least one LED is connected in series with the third switch. In a particular embodiment, the series connection of the at least one LED and the third switch is connected in parallel with both the series connection of the capacitor and the first switch and the series connection of the power dissipating element and the second switch. In a further particular embodiment, these three series connections are coupled between a positive and a negative rail, which are coupled to the power input.

The at least one LED may be one LED or a plurality of LED's. The plurality of LED's may be a series connection of LED's, also referred to as a string of LED's. It is also possible that multiple strings of LED's are connected in parallel.

According to a further embodiment, the LED light unit further comprises a current conditioning module having a power input side and a power output side, the current conditioning module being coupled between the power input on the power input side and the at least one LED, the capacitor and the power dissipating element on the power output side. In other words, the current conditioning module is an input circuit that forms a front end for the power received from the high intensity discharge lamp power supply. The current conditioning module is a means of transforming the power from the power supply into power than can be suitably received by the capacitor, the power dissipating element and the at least one LED.

According to a further embodiment, the current conditioning module is both an AC/DC converter and a DC/DC connector. In this way, the current conditioning module is able to provide DC power on the power output side, no matter if AC power or DC power is supplied by the power supply in a particular phase of operation. The term DC/DC connector covers both a mere electrical connection, such that the electrical behavior on the power input side is equal to the electric behavior on the power output side, as well as a DC/DC converter that converts the voltage level.

According to a further embodiment, the control circuit is coupled to both the power input side and the power output side of the current conditioning module and is further configured to sense an electric behavior at both the power input side and the power output side. This is a special case of the control circuit being configured to sense the electric behavior at the power input. In particular, the control circuit is thus able to sense the behavior of the raw power supplied by the power supply and the behavior of the conditioned power as supplied to the at least one LED and/or the capacitor and/or the power dissipating element. In this way, the control circuit has two inputs for making control decisions and selectively coupling any of the at least one LED, the capacitor and the power dissipating element to the power input.

It is pointed out that the provision of these two sensing connections is not necessary. One sensing connection is also sufficient. The control circuit can then deduce the behavior at the output of the high intensity discharge power supply and/or on the power output side of the current conditioning module from the expected behavior of the high intensity discharge power supply and/or the functionality of the current conditioning module.

In a particular embodiment, the power supplied by the high intensity discharge lamp power supply in the nominal operation mode may be between 30 W and 100 W, in particular between 40 W and 60 W, and more in particular ca. 50 W. In a particular embodiment, the charging phase may be between 10 ms and 30 ms in duration, in particular around 20 ms. In a further particular embodiment, the voltage conditioning phase may be between 5 ms and 20 ms in duration, in particular around 10 ms.

According to a further embodiment, the LED light unit is adapted to be an exterior light of a passenger transport vehicle, in particular the headlamp of a passenger transport vehicle. In particular, the LED light unit may be adapted to be the headlamp of an air plane.

Exemplary embodiments of the invention further include a passenger transport vehicle, such as an aircraft, a road vehicle, a ship or a rail car, having at least one LED light unit, as described in any of the embodiments above, the at least one LED light unit being positioned on the exterior of the passenger transport vehicle. The aircraft may be an air plane or a helicopter. The road vehicle may be a bus, a truck or a car. For example, the LED light unit may be a headlamp. Further in particular, the LED light unit may be the headlamp of an air plane. Above modifications and advantages equally apply to the passenger transport vehicle.

Exemplary embodiments of the invention further include a method of operating an LED light unit having at least one LED, in particular in a passenger transport vehicle, such as an aircraft, a road vehicle, a ship or a rail car, wherein a power input of the LED light unit is coupled to a high intensity discharge lamp power supply adapted to monitor its output behavior. The method comprises the steps of (a) coupling a capacitor to the power input for absorbing electrical energy from the high intensity discharge lamp power supply in a charging phase, (b) coupling a power dissipating element to the power input for dissipating electrical energy from the high intensity discharge lamp power supply in a voltage conditioning phase, and (c) de-coupling the power dissipating element from the power input in a nominal operation mode.

In a particular embodiment, each or both of steps (b) and (c) may comprise the feature of de-coupling the capacitor from the power input. The words coupling and de-coupling refer to the respective acts as well as to the action of keeping a particular element in a coupled or de-coupled state.

With the method of operating an LED light unit according to exemplary embodiments of the invention, the same advantages can be attained as with the LED light unit. This method can be developed further by method steps corresponding to the features as described above with regard to the LED light unit. In order to avoid redundancy, such embodiments and modifications of the method of operating an LED light unit are not repeated.

Exemplary embodiments of the invention further include a method of replacing a high intensity discharge lamp, in particular of a passenger transport vehicle, such as an aircraft, a road vehicle, a ship or a rail car, with an LED light unit, as described in any of the embodiments above, the method comprising the steps of (a) disconnecting the high intensity discharge lamp from the high intensity discharge lamp power supply, and (b) connecting the LED light unit, as described in any of the embodiments above, to the high intensity discharge lamp power supply. In this way, new energy-efficient and cost-efficient LED light units can be included into existing lighting systems in a seamless manner.

BRIEF DESCRIPTION OF THE DRAWINGS

Embodiments of the invention are described in greater detail below with reference to the figures, wherein.

DETAILED DESCRIPTION OF THE INVENTION

Figure 1:
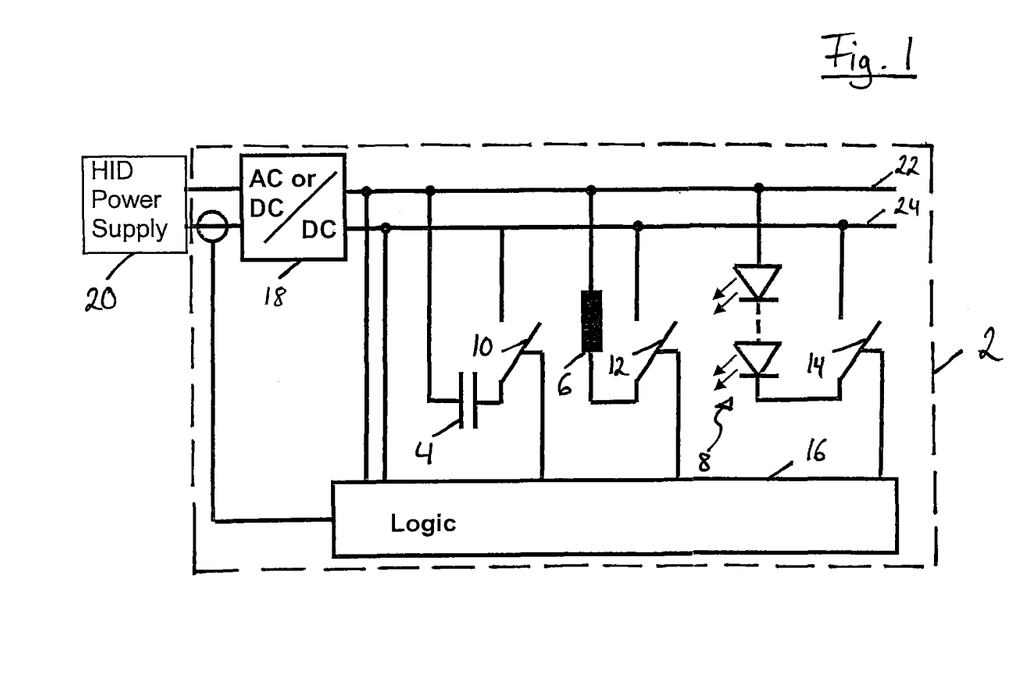
FIG. 1 shows a block/circuit diagram of an exemplary embodiment of an LED light unit in accordance with the invention, coupled to a high intensity discharge lamp power supply.

FIG. 1 shows a block/circuit diagram of an LED light unit 2 in accordance with an exemplary embodiment of the invention. The diagram is referred to as block/circuit diagram, because some elements are shown as functional blocks, while other elements are shown as circuit components. FIG. 1 does not only show the LED light unit 2, but also a high intensity discharge lamp power supply 20, also denoted HID power supply. The HID power supply 20 and the LED light unit 2 jointly form a lighting system. A dashed box is provided in FIG. 1 to indicate which elements are part of the LED light unit 2 in accordance with the exemplary embodiment. This dashed box is omitted from the subsequent figures.

The exemplary LED light unit 2 may be the headlamp of a commercial air plane. The HID power supply may be a conventional power supply, as is present in modern commercial air planes.

The LED light unit 2 has a capacitor 4, a resistor 6, a plurality of LEDs 8, a first switch 10, a second switch 12, and a third switch 14. It further comprises a control circuit 16, also referred to as control logic, and a current conditioning module 18, also referred to as AC or DC to DC converter. The LED light unit 2 is coupled to the HID power supply 20.

The individual circuit elements/circuit modules are coupled to each other as follows. The HID power supply 20 has two output terminals. These two output terminals are connected to two input terminals of the AC or DC to DC converter 18. These two input terminals form a power input side of the AC or DC to DC converter 18, which is the power input of the LED light unit 2. The AC or DC to DC converter 18 further has two output terminals, forming a power output side of the AC or DC to DC converter 18. These two output terminals are the electric connection points for the loads of the LED light unit 2. As these loads are operated with DC power from the connection points, these connection points are also referred to as a positive rail 22 and a negative rail 24.

The capacitor 4 and the first switch 10 are coupled in series between the positive rail 22 and the negative rail 24. The resistor 6 and the second switch 12 are also coupled in series between the positive rail 22 and the negative rail 24. The plurality of LEDs 8 and the third switch 14 are also coupled in series between the positive rail 22 and the negative rail 24. The plurality of LEDs 8 is a string of LEDs, i.e. a series connection of LEDs, in the exemplary embodiment of FIG. 1.

The control circuit 16 is coupled to one of the two connections between the HID power supply 20 and the power input side of the AC or DC to DC converter 18. It may also be coupled to both of the shown connections. The control circuit 16 is further coupled to the positive rail 22 and the negative rail 24. These connections are provided for sensing the electric behavior of the power input side and of the power output side of the AC or DC to DC converter 18, as will be explained below. The control circuit 16 is further coupled to the first switch 10, to the second switch 12, and to the third switch 14 by respective connection lines. These lines are provided for control of the first to third switches 10, 12, 14 by the control circuit 16.

Figure 4:
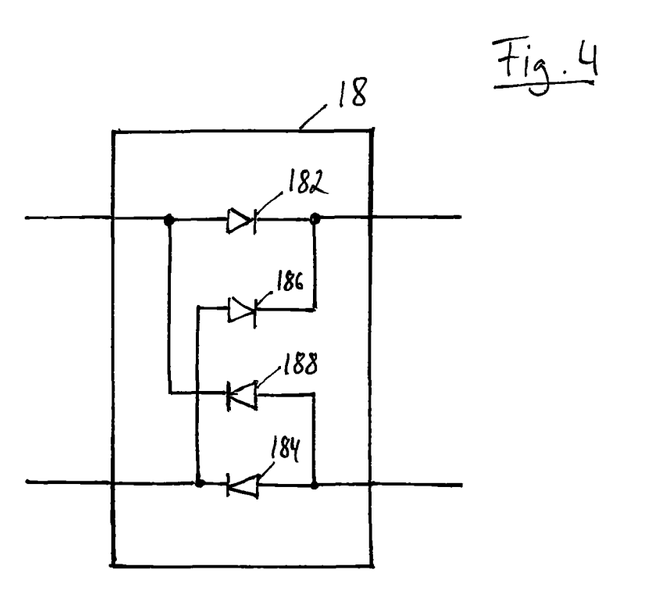
FIG. 4 shows an exemplary embodiment of a circuit structure of an AC or DC to DC converter, usable with the exemplary embodiment of the LED light unit of FIG. 1.

The current conditioning module 18 is referred to as AC or DC to DC converter, because it is a circuit module that is able to convert AC power from the power input side to DC power on the power output side on the one hand and that is able to pass through DC power from the power input side to the power output side on the other hand. A particular implementation of the current conditioning module 18 shown with respect to FIG. 4. FIG. 4 is a circuit diagram of an exemplary embodiment of the AC or DC to DC converter 18. The AC or DC to DC converter has four diodes 182, 184, 186, and 188, arranged in a bridge circuit. The four diodes allow positive DC current to pass through and rectify negative current. In this way, the four diode circuit is a simple and effective implementation of the functionality described above. More elaborate implementations of the AC or DC to DC converter are possible as well.

The control circuit 16 is also denoted control logic or simply logic, because it may be implemented in hardware with circuit logic elements. However, it is also possible to implement the control circuit 16 with a micro controller that carries out a program.

Figure 2A:
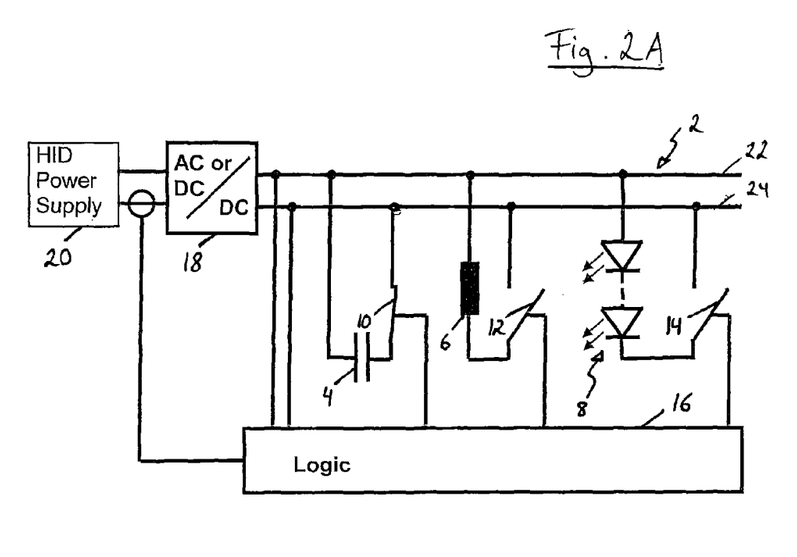
FIGS. 2A to 2D show four operating states of the exemplary embodiment of the LED light unit 2 of FIG. 1.
Figure 2B:
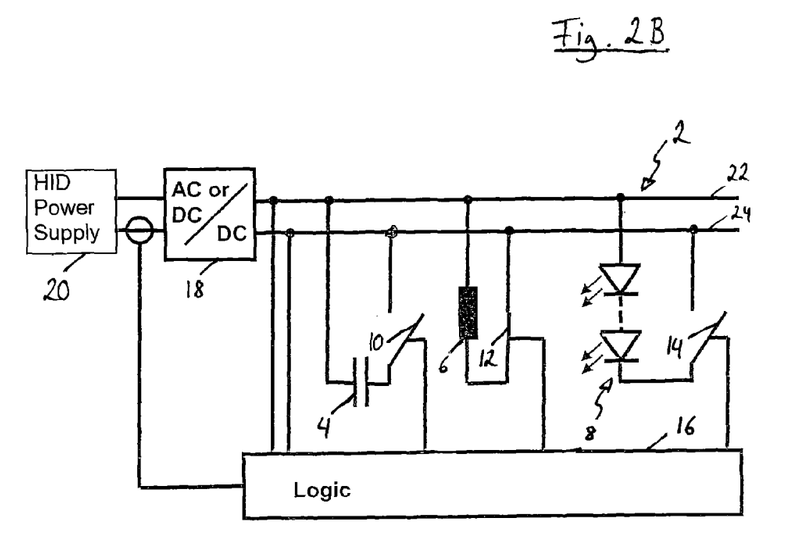
Figure 2C:
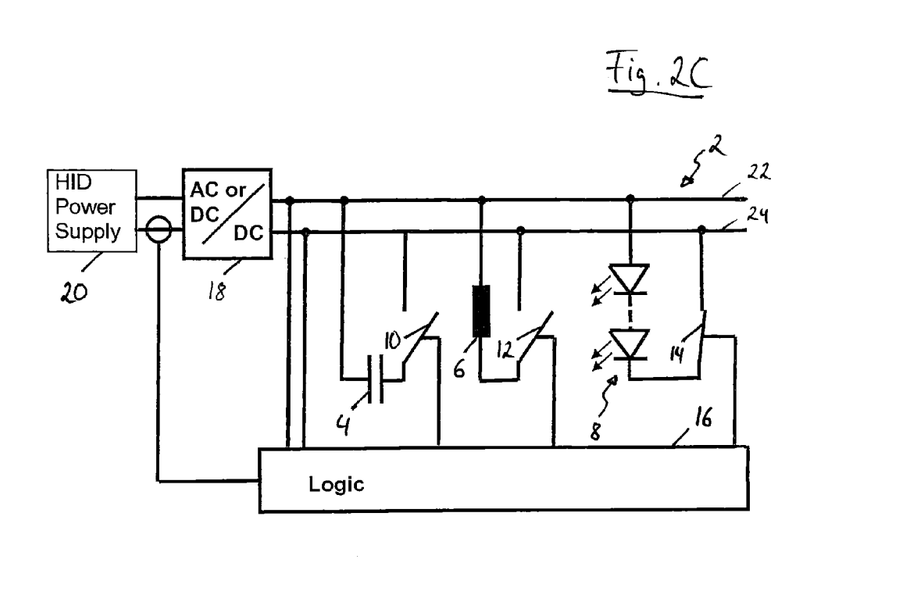
Figure 2D:
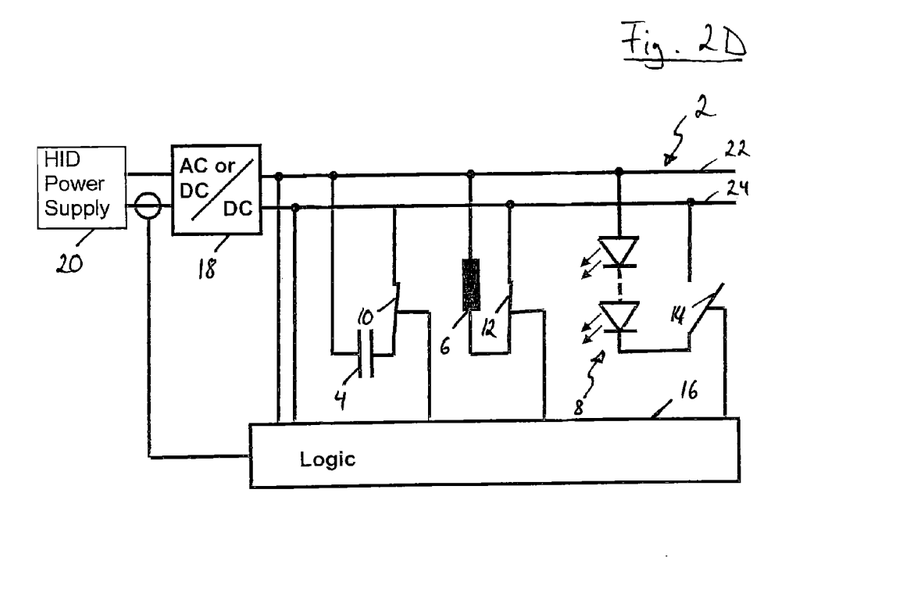
Figure 3:
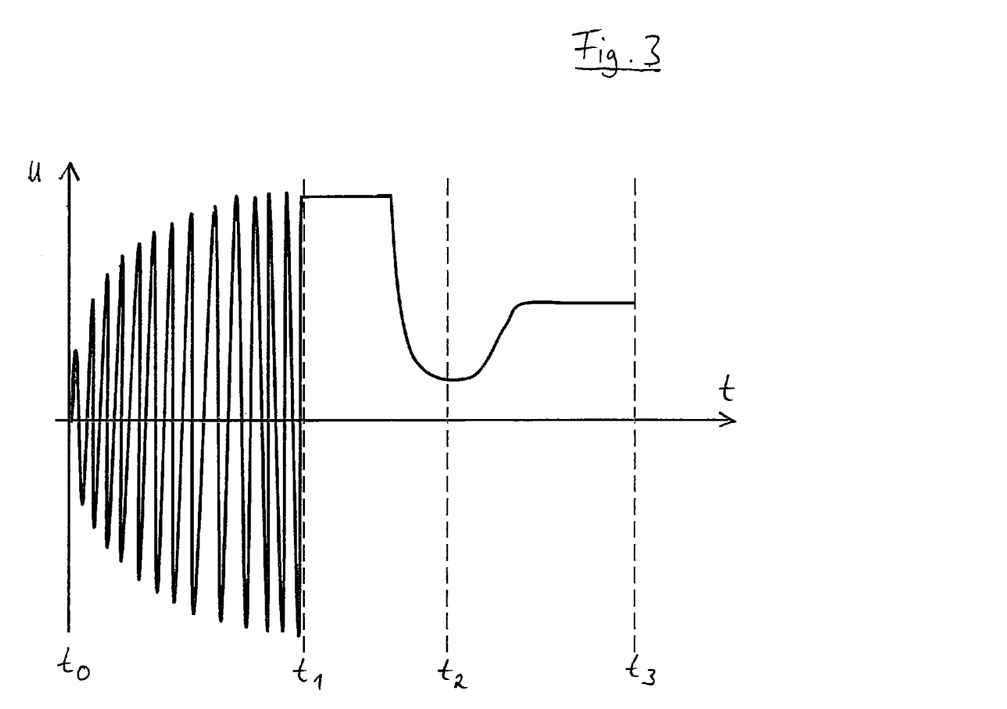
FIG. 3 shows an exemplary course of the voltage at the output of the high intensity discharge lamp power supply over time.

The operation of the LED unit 2 is now described with respect to FIGS. 2A to 2D and FIG. 3. FIGS. 2A to 2D show the switching state of the first to third switches 10, 12, 14 in four operational phases. FIG. 3 shows the voltage present at the output of the HID power supply 20 in these four phases according to an exemplary operation.

FIG. 2A shows the switching state in a charging phase, which is between $t_0$ and $t_1$ in FIG. 3. FIG. 2B shows the switching state in a voltage conditioning phase, which is between $t_1$ and h in FIG. 3. FIG. 2C shows the switching state in a nominal operation phase, also referred to as nominal operation mode, which is between h and $t_3$ in FIG. 3. FIG. 2D shows the switching state in a discharge phase, which is after h in FIG. 3.

FIG. 2A shows the switching state of the LED light unit 2 during a charging phase. In this phase, the HID power supply 20 outputs AC power, for example with a frequency of 1 kHz. When the control circuit 16 detects the output of an AC power from the HID power supply 20 via its connection with the power input side of the AC or DC to DC converter 18, it closes the first switch 10 and ensures that the second switch 12 and the third switch 14 are open.

The AC power from the HID power supply 20 is converted into DC power at the current conditioning module 18, which charges the capacitor 4. Charging the capacitor 4 results in the building up of a positive voltage between the positive rail 22 and the negative rail 24. As can be seen from the envelope of the output voltage of the HID power supply 20 between $t_0$ and $t_1$, the HID power supply 20 senses an increasing voltage at its output, resulting from the charge on the capacitor 4.

In this context, reference is again made to FIG. 4. When a positive current is flowing through the AC or DC to DC converter, the diodes 182 and 184 are in an active state, having a well-defined forward voltage drop. Accordingly, by monitoring the voltage at its output, the HID power supply 20 senses the voltage between the positive rail 22 and the negative rail 24, minus twice said forward voltage drop, which is commonly negligible.

In the exemplary embodiment of the figures, the HID power supply 20 expects the voltage at its output to rise to approx. 380 V within 20 ms in the charging phase. During that time, the HID power supply 20 provides AC power with a limited output current and monitors its output voltage. If the voltage rises too fast, the HID power supply assumes that there is an open load and discontinues the power supply. If the voltage rises too slow or does not reach the targeted 380 V, the HID power supply assumes that there is a malfunction of the connected lamp and also discontinues the power supply. The capacitor 4 is charged up and ensures a behavior of the LED light unit that satisfies the expectation by the HID power supply 20. In the exemplary embodiment of the figures, the capacitor 4 has a capacitance in the range of 600 nF to 750 nF, in particular of between 650 nF and 700 nF.

At the end of the charging phase, the HID power supply 20 supplies a DC voltage at its output and allows for a positive current to flow. In other words, the HID power supply 20 does not try to regulate the voltage at its output to that positive voltage value, but provides current at that voltage value if absorbed by the connected load. When the control circuit 16 detects this switch from the provision of AC power to DC power at the power input of the LED light unit 2, it opens the first switch 10 and closes the second switch 12. In this way, the capacitor 4 is decoupled from the negative rail 24, such that the voltage across the capacitor 4 does not determine the voltage between the positive and negative rails 22 and 24. Accordingly, the voltage between the positive rail 22 and the negative rail 24 decreases.

For a DC input on its power input side, the AC or DC to DC converter 18 merely connects its power input side to its power output side, such that an immediate connection between the output of the HID power supply 20 and the positive and negative rails 22 and 24 is formed. Accordingly, after a transitional phase of discharging parasitic loads in the LED light unit, a current to the resistor 6 forms, which is the result of the DC voltage output by the HID power supply 20.

The HID power supply 20 expects the voltage at its output to drop to a voltage value between 20 and 100 V in this transitional phase between t1 and t2, which is also referred to as voltage conditioning phase. In general, the HID power supply expects a voltage drop to or below a preset threshold value. If the voltage does not drop, the HID power supply 20 assumes an open load condition and discontinues the power supply. If the voltage drops to 0 V, the HID power supply 20 assumes a short circuit condition and also discontinues the power supply. The resistor is chosen to have a voltage drop in the expected range for the given power supply. In the exemplary embodiment of the figures, the resistor 6 has a value of between 60 and 100 Ohm, in particular of between 70 and 90 Ohm. In the exemplary embodiment of the figures, the preset threshold value is in a range between 70 and 90 V, in particular around 80 V.

The phase of constant voltage at the output of the HID power supply 20 in the beginning of the voltage conditioning phase, as shown between t1 and t2 in FIG. 3, is the result a time lag for closing the second switch 12 and opening the first switch 10, implemented in the control circuit 16. This time lag may be around 5 ms. It may be provided in order to more accurately emulate the behaviour of an HID light which commonly starts emitting light and exhibiting a voltage drop after a constant application of a DC voltage for a period of ca. 5 ms.

When the voltage between the positive rail 22 and the negative rail 24 drops to the preset threshold value, the HID power supply enters a nominal operation mode. Equally, when the control circuit 16 detects that preset threshold value with its connections to the positive rail 22 and the negative rail 24, it opens the second switch 12 and closes the third switch 14, as is shown in FIG. 2C. In this way, both the capacitor 4 and the resistor 6 are de-coupled from the power supply, such that substantially the entire supplied power is provided to the LEDs 8.

In the steady nominal operation mode, the HID power supply 20 delivers constant power, which may for example be 50 W. The delivered power may be AC power or DC power. With this constant power, the LEDs 8 are driven such that the LED light unit functions as the air plane headlamp in a steady state. For this nominal operation mode, the HID power supply 20 expects the voltage at its output to be in a range of 60 V to 180 V. The number and kind of LEDs 8 is chosen in such a way that the complete voltage drop is in the expected range and that the current puts all of the LEDs 8 in a desirable operating point, where illumination is achieved in a particular energy-efficient manner. In this way, the whole output power from the HID power supply 20 can be used efficiently, such that a very bright headlamp can be provided for the given power. In the exemplary embodiment of the figures, the plurality of LED's are a series connection of between 30 and 40 LED's.

When the control circuit 16 detects a discontinuing of the power supplied by the HID power supply 20, i.e. when the control circuit 16 detects a falling of the voltage at the output of the HID power supply 20 to around 0 V, the control circuit opens the third switch 14 and closes both the first switch 10 and the second switch 12, as is shown in FIG. 2D. In this way, the remaining charge on the capacitor 4 is discharged through the resistor 6. Accordingly, the LED light unit 2 returns to a completely discharged state and is readily available for a new illumination cycle. After a discharge phase, the control circuit 16 may open both the first switch 10 and the second switch 12, such that all three switches are open and the LED light unit 2 reacts to the HID power supply 20 in a fast and predictable manner. It is also possible that the control circuit closes the first switch 10, leaves the second and third switches 12 and 14 open and waits for a new illumination cycle in the switching state of FIG. 2A.

While the invention has been described with reference to exemplary embodiments, it will be understood by those skilled in the art that various changes may be made and equivalents may be substituted for elements thereof without departing from the scope of the invention.

In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A LED light unit, in particular for a passenger transport vehicle, such as an aircraft, a road vehicle, a ship or a rail car, the LED light unit having at least one LED and being configured to be used with a high intensity discharge lamp power supply that is adapted to monitor its output behavior, wherein the LED light unit comprises:
    a power input coupleable to the high intensity discharge lamp power supply,
    a capacitor switchably coupled to the power input for absorbing electrical energy from the high intensity discharge lamp power supply,
    a power dissipating element switchably coupled to the power input for dissipating electrical energy from the high intensity discharge lamp power supply, and
    a control circuit coupled to the power input, wherein the control circuit is configured to sense an electric behavior at the power input, deducing the kind of driving power supplied by the high intensity discharge lamp power supply, and is further configured to selectively couple the capacitor to the power input and to selectively couple the power dissipating element to the power input as a response to the electric behavior at the power input in such a way that the LED light unit emulates an electric behavior of a high intensity discharge lamp.

2. The LED light unit according to claim 1, wherein the power dissipating element is a resistor.

3. The LED light unit according to claim 1, wherein the capacitor is connected in series with a first switch and wherein the power dissipating element is connected in series with a second switch, wherein the series connection of the capacitor and the first switch is connected in parallel with the series connection of the power dissipating element and the second switch.

4. The LED light unit according to claim 1, wherein the control circuit is configured to couple the capacitor to the power input in a charging phase.

5. The LED light unit according to claim 1, wherein the control circuit is configured to couple the power dissipating element to the power input in a voltage conditioning phase.

6. The LED light unit according to claim 1, wherein the control circuit is configured to de-couple the power dissipating element from the power input in a nominal operation mode.

7. The LED light unit according to claim 1, wherein the at least one LED is switchably coupled to the power input.

8. The LED light unit according to claim 1, further comprising a current conditioning module having a power input side and a power output side, the current conditioning module being coupled between the power input on the power input side and to the at least one LED, the capacitor and the power dissipating element on the power output side.

9. The LED light unit according to claim 8, wherein the current conditioning module is both an AC/DC converter and a DC/DC connector.

10. The LED light unit according to claim 8, wherein the control circuit is coupled to both the power input side and the power output side of the current conditioning module and is further configured to sense an electric behavior at both the power input side and the power output side.

11. A Passenger transport vehicle, such as an aircraft, a road vehicle, a ship or a rail car, having at least one LED light unit according to claim 1, the at least one LED light unit being positioned on the exterior of the passenger transport vehicle.

12. A Method of operating an LED light unit having at least one LED, in particular in a passenger transport vehicle, such as an aircraft, a road vehicle, a ship or a rail car, wherein a power input of the LED light unit is coupled to a high intensity discharge lamp power supply adapted to monitor its output behavior, the method comprising the steps of:
    (a) coupling a capacitor to the power input for absorbing electrical energy from the high intensity discharge lamp power supply in a charging phase,
    (b) coupling a power dissipating element to the power input for dissipating electrical energy from the high intensity discharge lamp power supply in a voltage conditioning phase,
    (c) de-coupling the power dissipating element from the power input in a nominal operation mode, and
    (d) sensing an electric behavior at the power input, deducing the kind of driving power supplied by the high intensity discharge lamp power supply and carrying out steps (a), (b) and as a response to the electric behavior at the power input in such a way that the LED light unit emulates an electric behavior of a high intensity discharge lamp.

13. A Method of replacing a high intensity discharge lamp, in particular of a passenger transport vehicle, such as an aircraft, a road vehicle, a ship or a rail car, with an LED light unit according to claim 12, the method comprising the steps of:
    (a) disconnecting the high intensity discharge lamp from the high intensity discharge lamp power supply, and
    (b) connecting the LED light unit according to the high intensity discharge lamp power supply.

14. The method of claim 12, wherein the power dissipating element is a resistor.

* * * * *